(12) United States Patent
Farneth

(10) Patent No.: US 11,383,400 B2
(45) Date of Patent: Jul. 12, 2022

(54) TREE LIMB OR TRUNK CUTTING DEVICE

(71) Applicant: John Farneth, Baldwinsville, NY (US)

(72) Inventor: John Farneth, Baldwinsville, NY (US)

( * ) Notice: Subject to any disclaimer, the term of this patent is extended or adjusted under 35 U.S.C. 154(b) by 180 days.

(21) Appl. No.: 16/812,948

(22) Filed: Mar. 9, 2020

(65) Prior Publication Data
US 2021/0276216 A1 Sep. 9, 2021

(51) Int. Cl.
B27B 17/00 (2006.01)
B27B 29/00 (2006.01)

(52) U.S. Cl.
CPC .......... B27B 17/0083 (2013.01); B27B 29/00 (2013.01); B27B 17/0008 (2013.01)

(58) Field of Classification Search
CPC . B27B 17/0008; B27B 17/00; B27B 17/0083; B27B 29/00; A01G 23/091
USPC ..................................... 83/744–745
See application file for complete search history.

(56) References Cited

U.S. PATENT DOCUMENTS

| | | | |
|---|---|---|---|
| 2,974,694 A * | 7/1959 | Mattila | B27B 17/00 |
| 4,268,966 A | 5/1981 | Williams | |
| 4,566,188 A | 1/1986 | Wilson | |
| 4,657,234 A * | 4/1987 | Stout | B25B 11/00 |
| 4,726,274 A * | 2/1988 | Pitoni | B27B 17/00 |
| 4,760,646 A | 8/1988 | Siegler | |
| 4,916,818 A | 4/1990 | Panek | |
| 5,107,594 A * | 4/1992 | Ferreras | B27B 17/00 |
| 5,787,536 A | 8/1998 | Pate | |
| 5,884,403 A | 3/1999 | Rogers | |
| 5,884,545 A * | 3/1999 | Hamby, Jr. | B27B 17/0091 83/165 |
| 7,152,328 B2 | 12/2006 | Champlin | |
| 7,882,864 B2 | 2/2011 | Fargeot | |
| 8,015,715 B2 | 9/2011 | Perkins | |
| 8,307,865 B1 * | 11/2012 | Cuffel | A01G 23/0955 144/24.1 |
| 8,490,663 B2 | 7/2013 | Wright | |
| 8,517,066 B1 | 8/2013 | Van De Mortel et al. | |
| 8,935,856 B2 * | 1/2015 | Tsuruoka | F02F 7/0065 30/381 |
| 2006/0045717 A1 | 3/2006 | Seymour | |
| 2009/0277536 A1 * | 11/2009 | Scott | A01G 23/0955 144/24.13 |
| 2009/0314149 A1 | 12/2009 | Clark | |
| 2013/0299046 A1 | 11/2013 | Helenius | |

(Continued)

Primary Examiner — Ghassem Alie
Assistant Examiner — Nhat Chieu Q Do
(74) Attorney, Agent, or Firm — Dunlap Bennett & Ludwig, PLLC

(57) ABSTRACT

A tree limb or trunk cutter including a saw assembly, a clamp, and a remote controller. The saw assembly includes a housing, at least one motor disposed within the housing, and a saw bar support rotatably coupled to the housing. The motor is operatively coupled to the saw bar support and configured to rotate the saw bar support about an axis in a first direction and a second direction opposite the first direction. A wireless receiver coupled to the housing is operable to receive commands from a remote controller. The clamp is configured to secure to a limb or trunk of a tree. The housing releasably couples to the clamp. The remote controller is in communication with the wireless receiver and is configured to control a direction of rotation of the saw bar support and to control power provided to a chain drive.

7 Claims, 5 Drawing Sheets

(56) References Cited

U.S. PATENT DOCUMENTS

2014/0110021 A1* 4/2014 Divine ............... A01G 23/0955
144/24.13
2015/0114520 A1   4/2015 Given \* cited by examiner

TREE LIMB OR TRUNK CUTTING DEVICE

BACKGROUND OF THE INVENTION

The present invention generally relates to tree trimmers. More specifically, the present invention relates to a portable apparatus for remote removal of tree limbs and cut down trees.

Prior to the invention, tree branches could only be removed by an operator climbing the tree, on a ladder at unsafe heights, a manual chain cutter, or by using a truck equipped with a boom with an operator in a bucket with a saw.

High branch delimbing could only previously be accomplished by an operator with a large truck equipped with an extendible boom, an arborist climbing the tree to an unsafe height or an operator using a ladder and chainsaw. Pole saws used to trim branches usually require the operator to stand nearly under where the cut branch would fall and are limited to a height of approximately 12 feet from ground level. This type of saw blade cutter typically gets pinched by the branch due to the angle at which the operator can cut the limb. Delimbing from a large truck with a boom is also limited due to the access area required to position and operate the boom.

Tree trimming is one of the most dangerous occupations. It is estimated that there are over 40,000 trimming related injuries and an average of 80 deaths per year.

The present invention seeks to overcome the shortcomings of the prior art and provide a safe and cost-effective means of removing tree branches and cutting down trees.

SUMMARY OF THE INVENTION

In one aspect of the present invention, a tree limb or trunk cutter comprises: a saw assembly comprising: a housing; at least one motor disposed within the housing; a saw bar support rotatably coupled to the housing, wherein the at least one motor is operatively coupled to the saw bar support and configured to rotate the saw bar about an axis in a first direction and a second direction opposite the first direction; a saw bar coupled to the saw bar support; a saw chain rotatably coupled to the saw bar support; a chain drive operatively coupled to the at least one motor and configured to rotated the saw chain about a periphery of the saw bar; and a wireless receiver operable to receive commands from a remote controller; a clamp configured to secure to a limb or trunk of a tree, wherein the housing of the saw assembly releasably couples to the clamp; and the remote controller in communication with the wireless receiver and configured to control a direction of rotation of the saw bar support and to control power provided to the chain drive.

These and other features, aspects and advantages of the present invention will become better understood with reference to the following drawings, description and claims.

DETAILED DESCRIPTION OF THE INVENTION

The following detailed description is of the best currently contemplated modes of carrying out exemplary embodiments of the invention. The description is not to be taken in a limiting sense, but is made merely for the purpose of illustrating the general principles of the invention, since the scope of the invention is best defined by the appended claims.

The present invention includes a remote controlled, wireless, tree limb or trunk cutting device. The present invention includes a remote control, a rotational saw, and a clamp uniquely designed to allow a user to mount the saw unit on a limb or trunk to be trimmed and then retreat to a safe distance and operate the rotational saw with the remote control.

Figure 1:
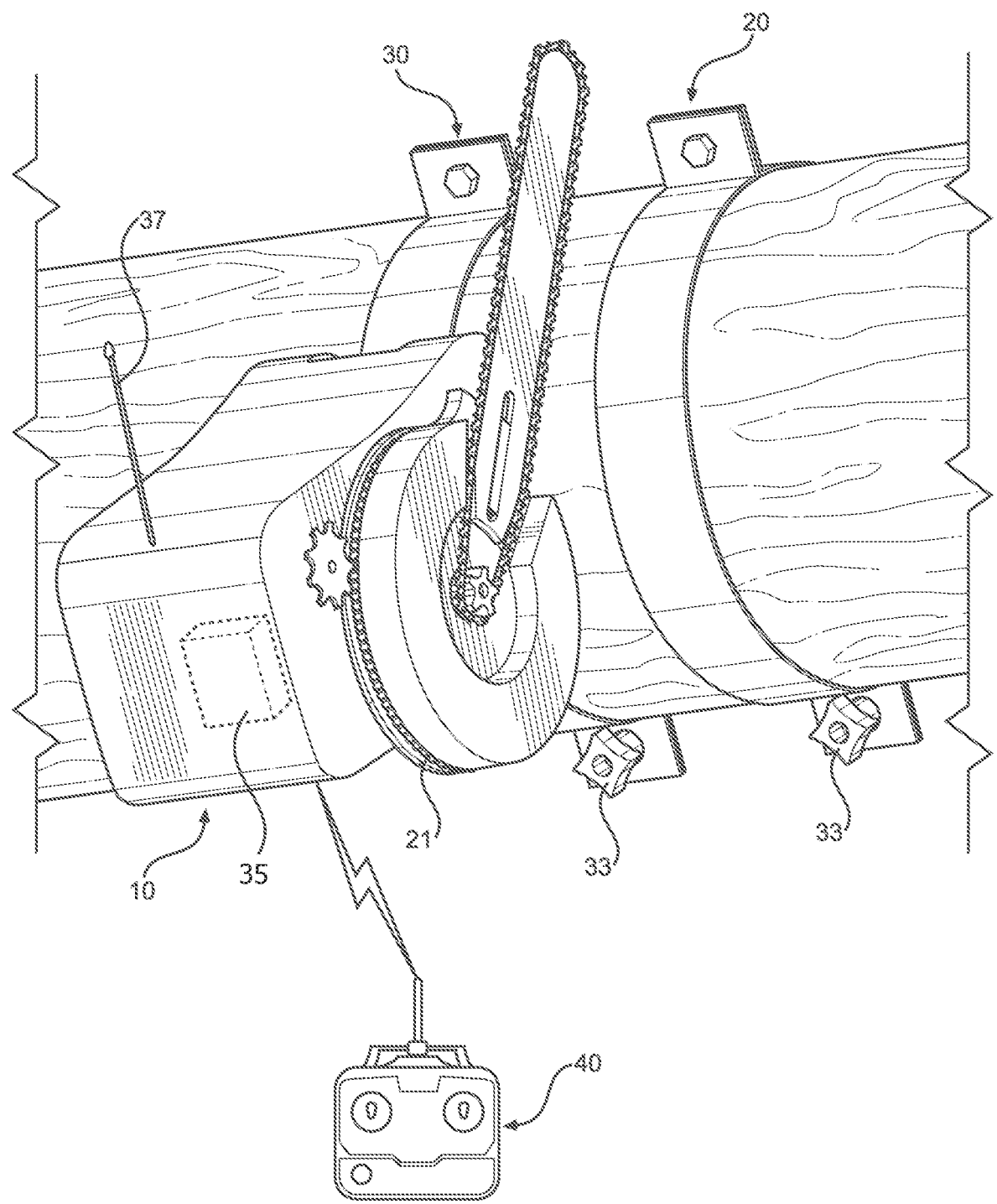
FIG. 1 is a perspective view of an embodiment of the present invention, illustrated in use.
Figure 2:
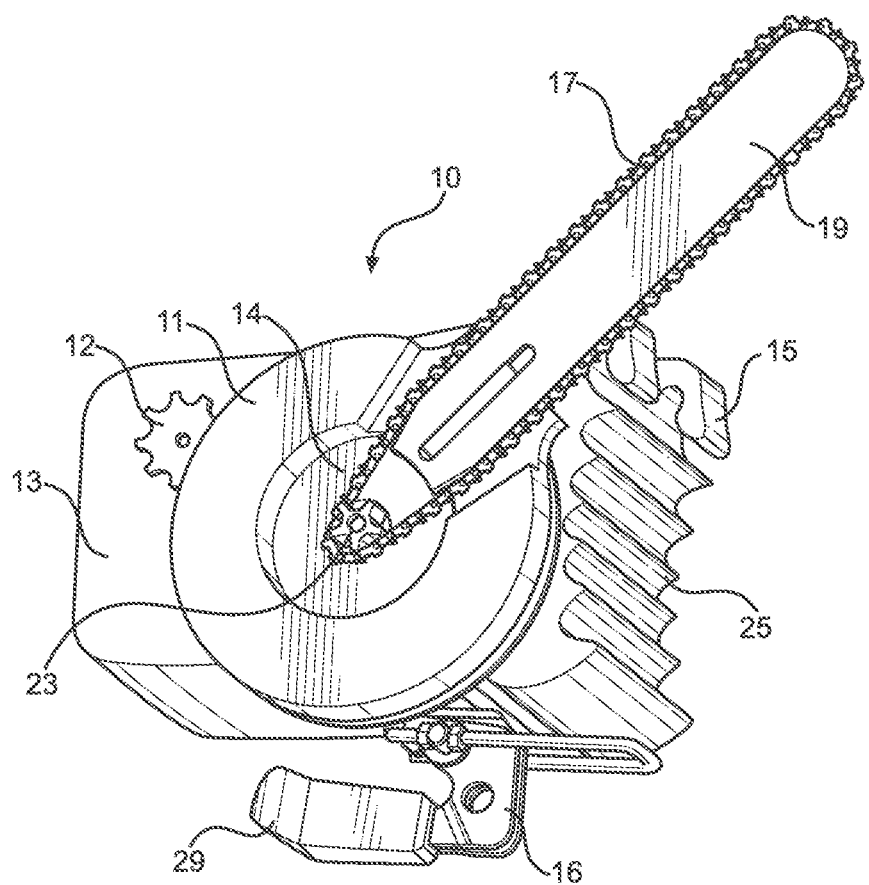
FIG. 2 is a perspective view of a saw assembly of an embodiment of the present invention.
Figure 3:
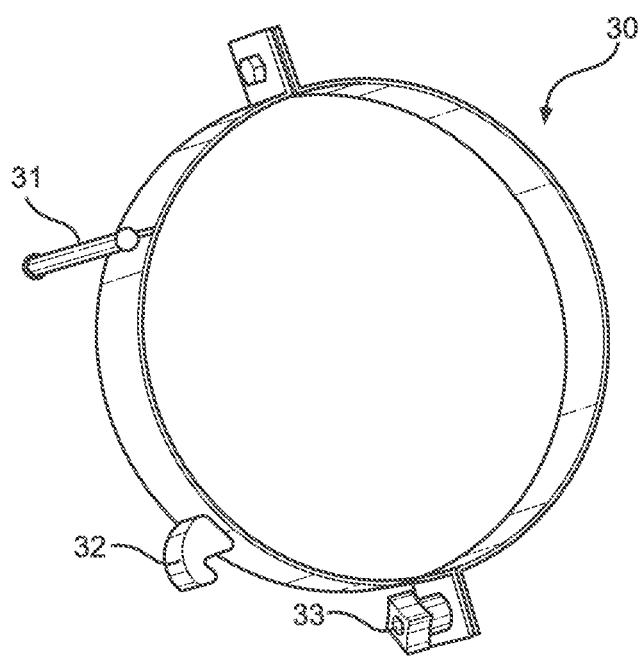
FIG. 3 is a perspective view of a clamp of an embodiment of the present invention.
Figure 4A:
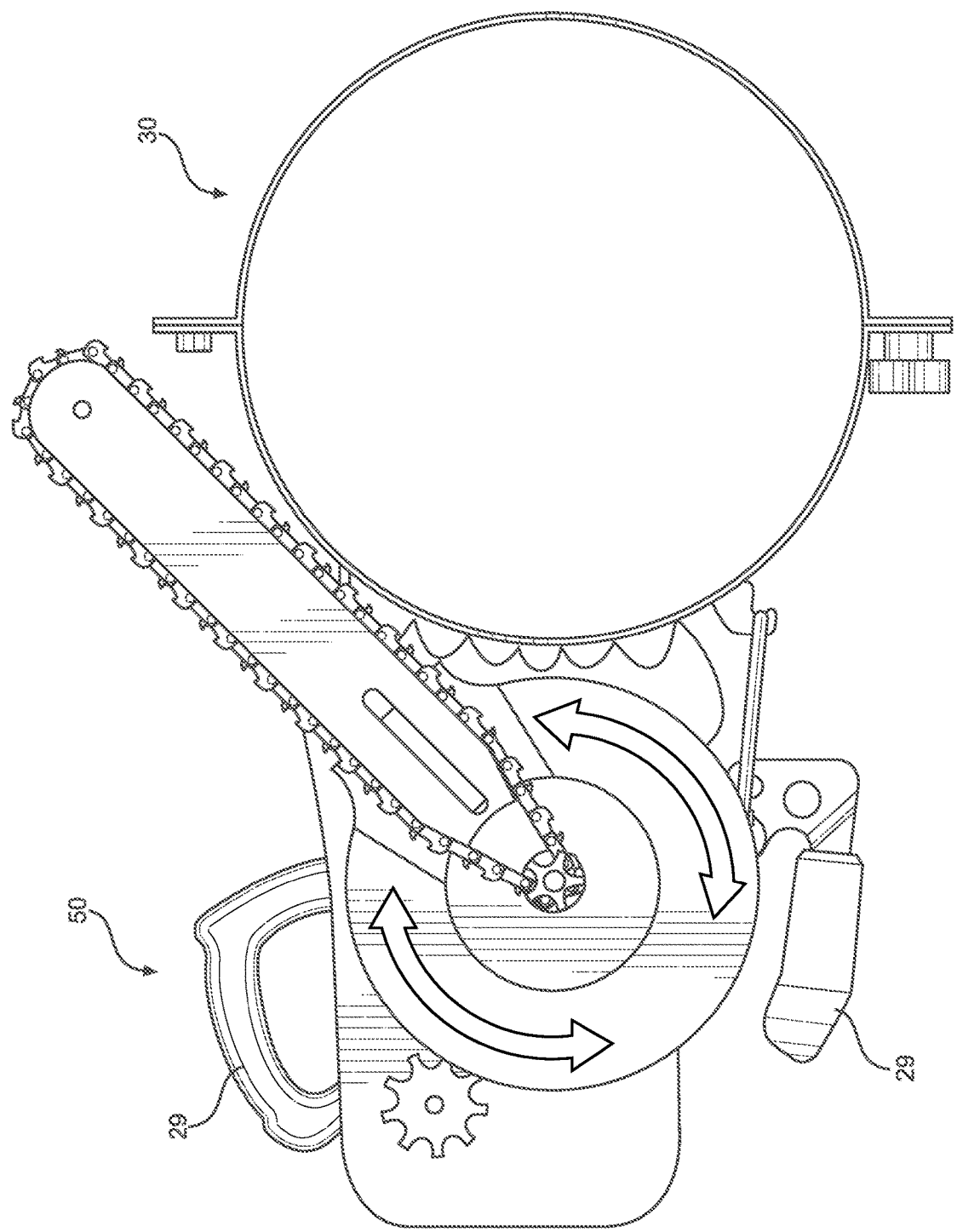
FIG. 4A is a side view of an embodiment of the present invention.
Figure 4B:
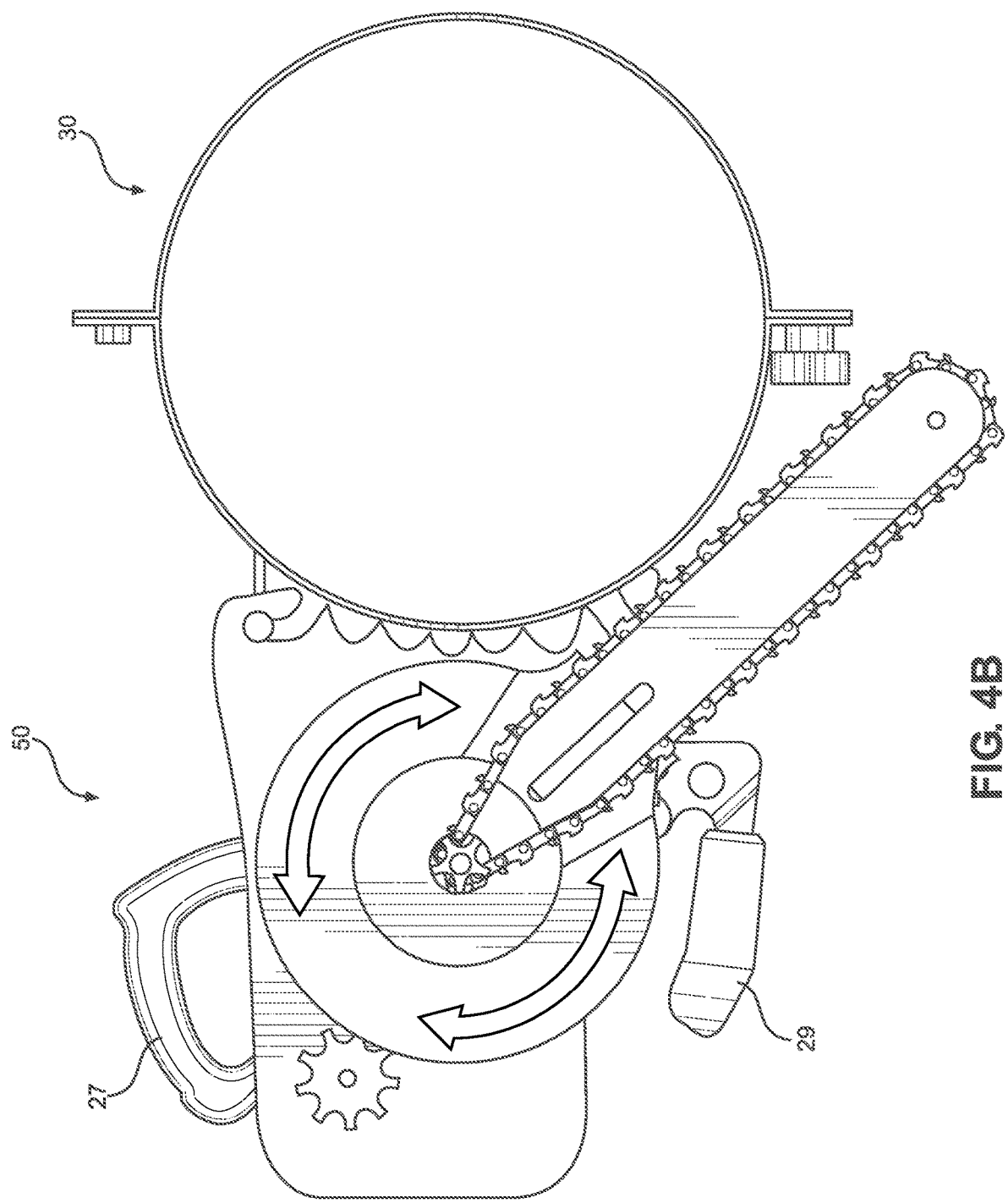
FIG. 4B is a side view of an embodiment of the present invention.
Figure 5:
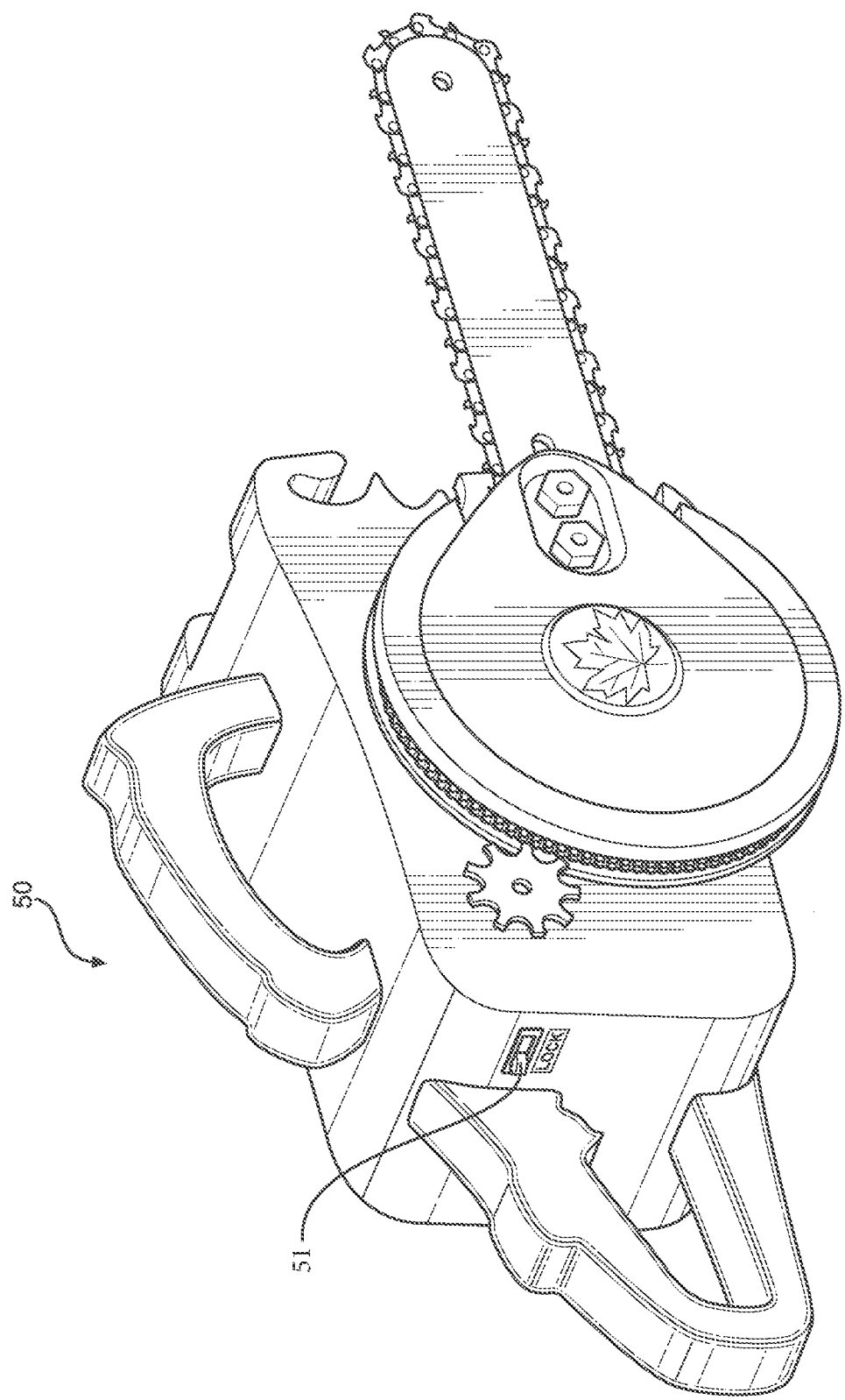
FIG. 5 is a perspective view of an embodiment of the present invention.

Referring to FIGS. 1 through 5, the present invention includes a tree limb or trunk cutter including a saw assembly 10, a clamp 30, and a remote controller 40. The saw assembly 10 includes a housing 13, at least one motor 35 disposed within the housing 13, and a saw bar support 11 rotatably coupled to the housing 13. The at least one motor 35 may include two motors, such as a first motor and a second motor. The first motor is operatively coupled to the saw bar support 11 and configured to rotate the saw bar support 11 about an axis in a first direction and a second direction opposite the first direction. A saw bar 19 is coupled to the saw bar support 11 and a saw chain 17 is rotatably coupled to the saw bar 19. A chain drive 23 is operatively coupled to the second motor and configured to rotate the saw chain 17 about a periphery of the saw bar 19. A wireless receiver 37 coupled to the housing 13 is operable to receive commands from the remote controller 40. The clamp 30 is configured to secure to a limb or trunk of a tree. The housing 13 releasably couples to the clamp 30. The remote controller 40 is in communication with the wireless receiver 37 and is configured to control a direction of rotation of the saw bar support 11 and to control power provided to the chain drive 23.

The housing 13 of the present invention includes a front surface, a first side, a second side, a top, a bottom, and a rear surface. The saw bar support 11 may be rotatably coupled to the first side and the saw bar 19 protrudes beyond the front surface. The saw bar support 11 may be rotatably coupled to the first side by a wheel bearing and a hub 14. The chain drive 23 may be disposed at a center of rotation of the saw bar support 11, which shortens an arc of the cut, allowing the invention to mount in a close proximity to the branch or tree trunk. Therefore, the saw bar support 11 and the chain drive 23 share the same axis of rotation. In certain embodiments, the motor(s) 35 drives a drive gear 12 which is interlocked with a drive chain 21 coupled circumferentially about the saw bar support 11, thereby rotating the saw bar support 11. The motor(s) 35 of the present invention may be an AC or DC saw chain motor, or a motor powered by fossil fuels. The housing 13 may further contain an electronic circuit board. The wireless receiver 37 and a microprocessor may be electrically connected to the electronic circuit board. The wireless receiver 37 may include a radio control (RC) receiver or other type of wireless receiver 37.

The motor(s) 35 may be switched on/off by electrical signals from the remote controller 40 that subsequently drives the saw chain 17 that cuts the limb or trunk. The saw bar support 11 provides the mounting platform for the saw bar 19 and the saw chain 17 and its rotation subsequently raises or lowers the saw bar 19 into or away from the limb or trunk. The electronic circuit board distributes and regulates the DC or AC power to the motor(s) 35 based on signals it receives from the wireless receiver 37 and microprocessor. The wireless receiver 37 and microprocessor amplify and interpret the signal from the remote controller 40 and subsequently sends electronic control and command signals to the electronic circuit board.

In certain embodiments, the front surface of the housing 13 includes housing couplers 15, 16 disposed at the top and the bottom. The clamp 30 may include clamp couplers 31, 32 releasably attachable of the housing couplers 15, 16. For example, the housing couplers 15, 16 may include at least one hook 15, such as a pair of hooks, disposed at the top and a looped latch 16 disposed at the bottom. The looped latch 16 may be extendable and retractable from the front surface. The clamp couplers 31, 32 may include a mounting rod 31 releasably attachable to the at least one hook 15 and a latch hook 32 releasably attachable to the looped latch 16. The front surface of the housing 13 may further include a plurality of teeth 25 to engage the tree limb or trunk and prevent the housing 13 from slipping relative to the tree limb or trunk. A bottom handle 29 may be coupled to the bottom of the housing 13 and a top handle 27 may be coupled to the top of the housing 13. The bottom handle 29 and the top handle 27 may be used to manipulate the housing 13 and attach and detach the housing 13 from the clamp couplers 31, 32. The present invention may further include a lock button 17, which locks the saw bar support 11 from rotating so that the saw bar 19 is disposed in a fixed horizontal position. The lock button 17 further turns off the wireless receiver 37, thereby preventing the remote controller 40 from controlling the motor(s) 35. In this mode, the present invention may be used as a regular chainsaw.

The clamp 30 may include a first half coupled to a second half defining a circular shape, and a knob 33 operable to tighten the first half and the second half together. The clamp 30 secures the housing 13 to the tree limb or trunk and is attached at an intended cut line. The present invention may further include a second clamp 20 also including a first half coupled to a second half defining a circular shape, and a knob 33 operable to tighten the first half and the second half together. The second clamp 20 may prevent the limb or trunk from splintering while the limb or trunk is being cut.

A method of using the present invention may include the following. A homeowner with young kids has a fenced in backyard bordering a wooded lot. A large limb overhangs part of it and the homeowner would like it to cut off for safety and to get more sun. The local tree company quotes a considerable amount as the tree is inaccessible. The homeowner being a DIY type uses the present invention to safely cut large limbs remotely and then once the tree or limb has been cut and is safely on the ground, operate as a regular hand held chainsaw to finish cutting it up to more manageable pieces. The homeowner extends a ladder to the limb(s) he wants cut, secures the clamps to the limb and main saw unit to the lower clamp, retreats to a safe distance and uses the RC to operate the saw and cut off the limb. Once the limb is safely on the ground, he then proceeds to change the mode of the saw unit to Hand Held control by engaging the LOCK switch which enables the hand controls on the handle, disables the RC, and locks the chain bar in a horizontal position. He then operates the saw as a regular hand held chain saw to further cut up the limb into smaller pieces.

It should be understood, of course, that the foregoing relates to exemplary embodiments of the invention and that modifications may be made without departing from the spirit and scope of the invention as set forth in the following claims.

What is claimed is:

1. A tree limb or trunk cutting system comprising:
   a saw assembly comprising:
      a housing;
      at least one motor disposed within the housing;
      a saw bar support rotatably coupled to the housing, wherein the at least one motor is operatively coupled to the saw bar support and configured to rotate the saw bar support about an axis in a first direction and a second direction opposite the first direction;
      a saw bar coupled to the saw bar support;
      a saw chain rotatably coupled to the saw bar support;
      a chain drive operatively coupled to the least one motor and configured to rotate the saw chain about a periphery of the saw bar; and
      a wireless receiver operable to receive commands from a remote controller;
   a clamp configured to secure to a limb or trunk of a tree, wherein the housing of the saw assembly releasably couples to the clamp; and
   the remote controller in communication with the wireless receiver and configured to control a direction of rotation of the saw bar support and to control power provided to the chain drive,
   wherein the housing comprising a front surface, a first side, a second side, a top, a bottom, and a rear surface, wherein the saw bar support is rotatably coupled to the first side and the saw bar protrudes beyond the front surface,
   wherein the front surface of the housing comprises housing couplers disposed at the top and the bottom of the housing, and the clamp comprises clamp couplers releasably attachable of the housing couplers, and
   wherein the housing couplers comprise at least one hook disposed at the top and a looped latch at the bottom, and the clamp couplers comprise a mounting rod releasably attachable to the at least one hook and a latch hook releasably attachable to the looped latch.

2. The tree limb or trunk cutting system of claim 1, wherein the at least one motor drives a drive gear, wherein a drive chain is coupled to the saw bar support and the drive gear interlocks with the drive chain.

3. The tree limb or trunk cutting system of claim 1, wherein the front surface comprises a plurality of teeth.

4. The tree limb or trunk cutting system of claim 1, wherein the clamp comprises a first half coupled to a second half defining a circular shape, and a knob operable to tighten the first half and the second half together.

5. The tree limb or trunk cutting system of claim 4, further comprising a second clamp comprising a first half coupled to a second half defining a circular shape, and knob operable to tighten the first half and the second half together.

6. The tree limb or trunk cutting system of claim 1, further comprising a handle coupled to the housing.

7. The tree limb or trunk cutting system of claim 6, wherein the handle is coupled to the bottom of the housing.

* * * * *